United States Patent [19]

Fraser, Jr. et al.

[11] 4,456,941

[45] Jun. 26, 1984

[54] PROTECTION DEVICE

[75] Inventors: Howard H. Fraser, Jr., Lafayette, N.Y.; John J. Jacobs, Flint, Tex.

[73] Assignee: Carrier Corporation, Syracuse, N.Y.

[21] Appl. No.: 421,744

[22] Filed: Sep. 23, 1982

[51] Int. Cl.³ .......................... H02H 5/04; H02H 5/08

[52] U.S. Cl. .................................. 361/105; 200/83 P; 337/3; 361/24

[58] Field of Search ...................... 361/23, 24, 26, 103, 361/105; 337/2, 3, 12, 13, 96, 299; 200/83 P, 83 Y

[56] References Cited

U.S. PATENT DOCUMENTS

| | | | |
|---|---|---|---|
| 2,454,288 | 11/1948 | Michaelson | 200/81.5 |
| 2,562,286 | 7/1951 | Wall | 200/83 |
| 2,978,879 | 4/1961 | Heidorn | 62/209 |
| 3,141,996 | 7/1964 | McGrath . | |
| 3,451,028 | 6/1969 | Schmitt | 337/343 |
| 3,493,911 | 2/1970 | Broetto | 337/299 X |
| 3,500,277 | 3/1970 | Nardulli | 337/3 |
| 3,525,914 | 8/1970 | Vind | 318/221 |
| 3,551,868 | 12/1970 | Good | 337/96 |
| 3,575,645 | 7/1970 | Doversberger | |
| 3,586,910 | 5/1970 | Sauber | |
| 3,933,005 | 1/1976 | Beltz | 62/228 |
| 4,091,249 | 5/1978 | Huffman | 200/83 P |

*Primary Examiner*—Harry E. Moose, Jr.
*Attorney, Agent, or Firm*—David J. Zobkiw

[57] ABSTRACT

An electric motor protection device comprising a body, an electric strip, a plunger, and pressure and temperature sensitive snap discs. The electric strip moves from a current conductive, closed position to a current non-conductive, open position when the current conducted through the strip exceeds a preset level. The plunger engages the electric strip also to move the strip from the closed position to the open position. The pressure and temperature discs move from normal positions to over-center positions to engage the plunger and move the electric strip from the closed position to the open position, respectively, when the vapor pressure forces on the pressure disc and the temperature of the temperature disc exceed preset values.

11 Claims, 6 Drawing Figures

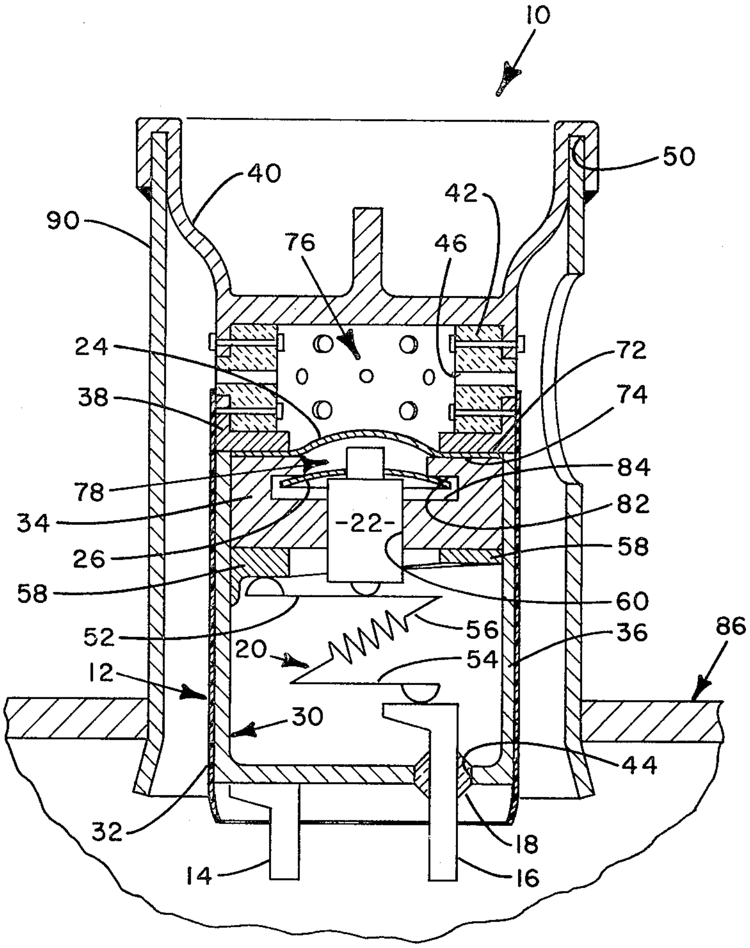
FIG. 1
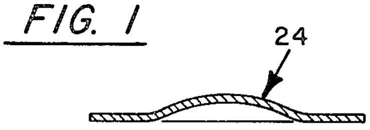
FIG. 3
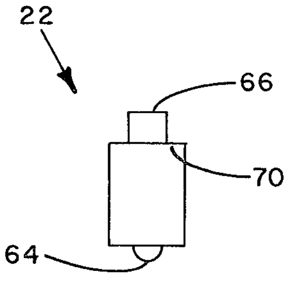
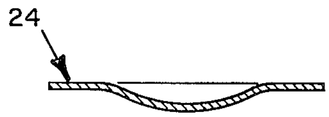
FIG. 4
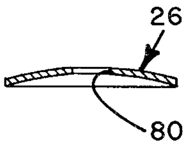
FIG. 5
FIG. 2
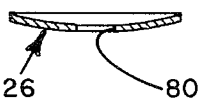
FIG. 6

PROTECTION DEVICE

BACKGROUND OF THE INVENTION

This invention generally relates to protection devices, and more specifically to an integral current, temperature, and pressure sensitive protection device especially well suited for use with hermetically and semi-hermetically sealed motor-compressor units.

The utilization of electrically driven hermetically and semi-hermetically sealed motor-compressor units has become increasingly prevalent in recent years, particularly in refrigeration applications where the motor-compressor units are employed to compress refrigerant vapor. Typically, these motor-compressor units are provided with protection systems to protect the units against excessive pressure, temperature, and current, and numerous such systems are well known in the art.

While these prior art systems operate effectively, it is believed that they suffer various disadvantages. For example, these protection systems conventionally employ a plurality of separate devices, with each device sensing one or at most two parameters and terminating operation of the motor-compressor unit when a sensed parameter exceeds a preset value. With this arrangement, a separate operation is needed to install each sensing device and, should it be necessary to remove the devices, a separate operation is similarly needed to remove each sensing device. This tends to result in relatively high assembly and maintenance costs for the protection systems.

In addition, the prior art protection systems commonly involve conflicting goals or considerations. In particular, to optimize accuracy, a sensor such as a motor temperature sensor may be located inside the motor-compressor unit. With a hermetically or semi-hermetically sealed motor-compressor unit, though, this makes it difficult to remove the sensor and may make it practically impossible to replace the sensor without replacing the entire motor-compressor unit. Locating the sensor outside the motor-compressor unit substantially facilitates removing the sensor, but this usually adversely affects the accuracy of the sensor. While many prior art protection systems provide a satisfactory compromise between these conflicting goals, it is nonetheless felt that a better compromise may be achieved.

SUMMARY OF THE INVENTION

An object of the present invention is to provide a unitary pressure, temperature, and current sensitive protection device.

Another object of this invention is to provide a pressure, temperature, and current sensitive protection device which may be located in direct communication with the interior of a motor-compressor unit while still being very simple to secure to and remove from the motor-compressor unit.

A further object of the present invention is to provide a pressure, temperature, and current sensitive protection device for a motor-compressor unit which may be employed therewith while maintaining the electric leads of the protection device and the electric connection between those leads and the motor-compressor unit completely enclosed by the protection device and the motor-compressor unit.

These and other objects are attained with a protection device comprising a body, first and second electric leads, and insulating means. The protection device further includes an electric strip, a plunger, a pressure sensitive snap disc, and a temperature sensitive snap disc. The body of the protection device defines an interior, an electric lead opening, and port means for conducting fluid between the interior and the exterior of the body. The first electric lead is electrically connected to the body, the second electric lead extends through the electric lead opening into the interior of the body, and the insulating means electrically insulates the second electric lead from the surfaces of the body defining the electric lead opening.

The electric strip is located within the body, has a closed position for conducting electric current between the body and the second electric lead and an open position for electrically separating the body from the second electric lead, and moves from the closed position to the open position when the magnitude of the current conducted through the electric strip exceeds a preset current level. The plunger is movably supported within the body for engaging the electric strip also to move the electric strip from its closed position to its open position.

The pressure sensitive snap disc is located within the body, and moves from a normal position to an overcenter position to engage the plunger and move the electric strip from the closed position to the open position when the vapor pressure forces on the pressure sensitive snap disc exceed a preset value. The temperature sensitive snap disc is also located within the body, and moves from a normal position to an overcenter position to engage the plunger and move the electric strip from its closed position to its open position when the temperature of the temperature sensitive snap disc exceeds a preset value.

A BRIEF DESCRIPTION OF THE DRAWINGS

FIG. 1 is a side view, primarily in cross section, of a protection device illustrating teachings of the present invention, and also showing portions of a motor-compressor unit with which the protection device may be used;

FIG. 2 is a side view of the plunger of the protection device;

FIGS. 3 and 4 are side, cross sectional views of the pressure sensitive snap disc of the protection device, showing the pressure disc in normal and overcenter positions respectively; and FIGS. 5 and 6 are side, cross sectional views of the temperature sensitive snap disc of the protection device, showing the temperature disc in normal and overcenter positions respectively.

A DETAILED DESCRIPTION OF THE PREFERRED EMBODIMENT

FIG. 1 illustrates protection device 10 in accordance with a preferred embodiment of the present invention. Generally, protection device 10 comprises body 12, first and second electric leads 14 and 16, and insulating means 18. Device 10 further includes electric conductive strip 20, plunger 22, pressure sensitive snap disc 24, and temperature sensitive snap disc 26. Preferably, body 12 includes shell 30, sleeve 32, and plunger guide 34; and this shell, in turn, comprises first or lower section 36, second or intermediate section 38, third or upper section 40, and connecting section 42.

Body 12 defines and substantially encloses an interior space or region, and also defines electric lead opening 44 and port means 46 for conducting fluid between the interior and the exterior of the body. Discussing body 12 in greater detail, shell sections 36, 38 and 42 and a lower portion of shell section 40 all are generally cylindrically shaped, have the same outside diameter, and, in assembly, are coaxially aligned with each other and axially located one on top of the other, forming a smooth, continuous outside cylindrical surface. Lower shell section 36 includes a radial base that forms the bottom of body 12, and upper shell section 40 includes a radial wall that extends across an upper portion of body 12.

Lower shell section 36 and intermediate shell section 38 are preferably welded together along the outside circumference of their interface. Connecting section 42 is connected to intermediate shell section 38 via a plurality of fastening means such as pins and to upper shell section 40 also via a plurality of fastening means again such as pins, thus indirectly connecting together the intermediate and upper shell sections. Preferably, the base of lower shell section 36 defines electric lead opening 44, and a plurality of bores radially extend through connecting section 42 to form body port means 46.

Connecting section 42, in addition to physically indirectly connecting intermediate and upper shell sections 38 and 40, is also employed to separate these two shell sections electrically. In particular, connecting section 42 is formed from an electrically nonconductive material such as a glass or ceramic and, since it axially extends and maintains a space between shell section 38 and 40, prevents the conduction of any electric current therebetween. Furthermore, an upper portion of upper shell section 40 defines annularly extending, U-shaped channel 50, which, as discussed below in greater detail, facilitates securing protection device 10 to an external body or shell.

Sleeve 32 encircles and covers outside surfaces of a lower portion of shell 30, specifically lower shell and intermediate shell sections 36 and 38, to insulate this portion of the shell electrically from material which may be located adjacent thereto during operation of protection device 10. Preferably, sleeve 32 is held in position by pressure engagement between the sleeve and shell 30 and is formed from a strong, thin insulating material such as Mylar polyester which may be secured in place via a conventional heat-shrink process.

First electric lead 14 is electrically connected to body 12, specifically to the base of lower shell section 36, in a manner, for example by welding, producing a good electrical connection therebetween. Second electric lead 16 extends through electric lead opening 44, into the interior of body 12. Insulating means 18 electrically insulates second electric lead 16 from the surfaces of body 12 defining electric lead opening 44, and may comprise a glass or ceramic seal molded in position between adjacent surfaces of the second electrical lead and body 12.

Electric strip 20 is located within body 12, has a closed position (shown in FIG. 1) for conducting electric current between the body and second electrical lead 16 and an open position for electrically separating the body from the second electrical lead, and moves from the closed position to the open position when the magnitude of the current conducted through the electric strip exceeds a preset current level. Preferably electric strip 20 includes two generally parallel, spaced legs 52 and 54 and a third leg 56 diagonally extending therebetween.

First leg 52 has a connected position engaging body 12, specifically projection 58 thereof, and a disconnected position spaced from the body, and the first leg of electric strip 20 moves from its connected position to its disconnected position to move the electric strip from its closed position to its open position. Second leg 54 engages second electric lead 16 to conduct current between electric strip 20 and the second electric lead. Third leg 56, which preferably includes an electric resistor, extends between and connects diagonally opposed ends of the first and second legs 52 and 54. Electric strip 20 may be formed from conventional bimetallic material such that, when the current through the strip exceeds the preset value, the strip will sufficiently heat to cause leg 52 to bend away from body projection 58.

Plunger guide 34 is secured within shell 30 and defines plunger opening 60. In particular, plunger guide 34 has a generally solid, cylindrical shape, radially extends across the interior of shell 30, and defines a central, axial opening which forms plunger opening 60. Plunger guide 34 may be secured within shell 30 in any suitable manner. With the embodiment of protection device 10 depicted in the drawing, plunger guide 34 rests on and is supported by body projection 58, which in turn is rigidly secured, for instance by welding, to inside surfaces of lower shell section 36. At the same time, an inside flange of intermediate shell section 38 projects above plunger guide 34, axially capturing the plunger guide between body projection 58 and the bottom surface of the inside flange of the intermediate shell section.

Plunger 22 is movably supported within body 12 for engaging electric strip 20 to move the electric strip from its closed position to its open position. Discussing plunger 22 in greater detail, the plunger extends through plunger opening 60 in a close, sliding fit with the surfaces of plunger guide 34 defining the plunger opening, and the plunger engages, is supported by, and is normally urged upward by electric strip 20. With reference to FIGS. 1 and 2, plunger 22 includes first and second spaced apart axial ends 64 and 66 and defines annular shoulder 70 spaced therebetween. In assembly, first end 64 of plunger 22 rests on first leg 52 of electric strip 20 so that the electric strip supports the plunger within body 12, and the first end of the plunger may be rounded to reduce frictional wear between the plunger and electric strip.

With the above-described arrangement, plunger 22 is employed to move first leg 52 of electric strip 20 from its connected position to its disconnected position to move the electric strip from its closed position to its open position. It should be noted, however, that with modifications well within the purview of those skilled in the art, protection device 10 may be designed with first leg 52 of electric strip 20 continuously engaging body 12, with second leg 54 of the electric strip having a connected position engaging second electric lead 16 and a disconnected position spaced therefrom, and with plunger 22 engaging and employed to move the second leg of the electric strip from its connected position to its disconnected position to move the electric strip from a closed position to an electrically nonconductive open position.

Pressure sensitive snap disc 24 is located within body 12, and moves from a normal position (shown in FIGS. 1 and 3) to an overcenter position (shown in FIG. 4) to engage plunger 22 and move electric strip 20 from the closed position to the open position when the vapor pressure forces on the pressure sensitive disc exceed a preset value. More specifically, pressure disc 24 may comprise a conventional bimetallic disc having a normally upwardly convex shape which suddenly snaps between its normal position and an overcenter, concave position in an ordinary manner as the pressure forces on the pressure disc vary; and as the pressure sensitive snap disc moves from its normal position to its overcenter position, the disc engages second end 66 of plunger 22 and forces the plunger downward to push first leg 52 of electric strip 20 away from body projection 58.

Preferably, peripheral portions of pressure sensitive disc 24 extend between opposed, axially spaced first and second radial shoulders 72 and 74 defined by body 12, specifically the bottom surface of the inside flange of intermediate shell section 38 and the top surface of plunger guide 34, in a vapor tight pressure fit against these opposed shoulders, and the pressure disc extends across the interior of body 12 and separates the interior thereof into first or upper and second or lower regions 76 and 78. First region 76 is in fluid communication with the exterior of body 12 via port means 46, but pressure sensitive disc 24 prevents fluid flow between first and second regions 76 and 78 of the body. Second region 78, though, is in heat transfer relation with first region 76 via pressure disc 24 and with the exterior of body 12 the base of shell 30. Disc 24 may be held in place simply by the pressure engagement between the peripheral portions of the disc and contiguous surfaces of body 12. Alternately, specific fastening means such as pins may be used to secure disc 24 in place. With this preferred embodiment of protection device 10, second body region 78 may be filled with a vapor which inhibits electrical arcing between the portion of second electrical lead inside body 12 and adjacent, interior surfaces thereof.

Temperature sensitive snap disc 26 is located within body 12, and moves from a normal position (shown in FIGS. 1 and 5) to an overcenter position (shown in FIG. 6) to engage plunger 22 and move electric strip 20 from the closed position to the open position when the temperature of the temperature sensitive disc exceeds a preset value. More particularly, temperature disc 26 may comprise a conventional bimetallic disc having a normally upwardly convex shape which suddenly snaps between its normal position and an overcenter, concave position in an ordinary manner as the temperature of the temperature disc varies.

With reference to FIGS. 1, 2, 5 and 6, temperature disc 26 defines central opening 80, plunger 22 extends therethrough, with shoulder 70 of the plunger located directly below inner portions of the temperature sensitive disc; and as the temperature sensitive snap disc moves from its normal position to its overcenter position, this disc engages the shoulder of the plunger to push the plunger downward and separate first leg 52 of electric strip 20 from body projection 58. In assembly, temperature sensitive snap disc 26 is secured within second region 78 of body 12 and, consequently, moves from its normal position to its overcenter position when the vapor temperature in the second region of the body exceeds a preset temperature. Preferably, peripheral portions of temperature sensitive disc 24 extend and are loosely captured between opposed, axially spaced third and fourth, radial shoulders 82 and 84 defined by body 12, specifically plunger guide 34.

Protection device 10 is especially well suited to protect a hermetically or semi-hermetically sealed, electrically driven motor-compressor unit from excessive vapor pressure, vapor temperature, and motor current. Portions of a motor compressor unit, specifically a section of shell 86 including discharge outlet 90 thereof, are shown in FIG. 1. To employ protection device 10 with the motor-compressor unit, electric leads 14 and 16 are connected in a lead line between the motor of the motor-compressor unit and an electric power supply therefor so that first electric lead 14, shell 30, body projection 58, electric strip 20, and second electric lead 16 are all connected in series between the motor and the electric power supply therefor. Next, protection device 10 is connected to shell 86 of the motor compressor unit with port means 46 in fluid communication with vapor from or in discharge outlet 90.

This may be done, for example, by fitting the surfaces of shell 30 defining U-shaped channel 50 over the top, outside edge of discharge outlet 90 of shell 86 in a pressure type fit therewith. Overlapping outside surfaces of shell 30 and discharge outlet 90 may then be brazed together to further secure protection device 10 in place, and this brazing connection may be extended completely around the discharge outlet to insure a vapor type fit between the protection device and the discharge outlet. With protection device 10 so connected to the motor compressor unit, electric leads 14 and 16, as well as the connections between those leads and the motor leads of the motor-compressor unit, are completely enclosed by shell 86 and protective device 10, protecting leads 14 and 16 and their motor lead connections from the ambient.

In operation, the current conducted through the motor of the motor-compressor unit also passes through electric strip 20. If this current exceeds a preset level, first leg 52 of electric strip 20 bends away from projection 58 and moves into its disconnected position, breaking the electrical contact between body 12 and the electrical strip. This opens the electric circuit for the motor of the motor-compressor unit, terminating operation of that motor. In addition, the discharge vapor from the compressor of the motor-compressor unit is conducted through bores 46 into upper region 76 of body 12, bringing the vapor pressure in upper region 76 to the same level as that of the vapor discharged from the compressor of the motor-compressor unit. If this vapor pressure exceeds a preset value, pressure sensitive snap disc 24 snaps into its overcenter position. Disc 24 pushes plunger 22 downward, and this forces first leg 52 of electric strip 20 downward away from body projection 58. First leg 52 of electric strip 20 is moved into its disconnected position, opening the electric circuit for and hence discontinuing operation of the motor of the motor-compressor unit.

At the same time, vapor within lower chamber 78 of body 12, while not in fluid communication with the vapor in upper chamber 76 or with vapor outside protection device 10, is in heat transfer relation therewith. Thus, the vapor temperature inside lower chamber 78 is substantially equal to the vapor temperature inside discharge outlet 90; and if this vapor temperature rises above a predetermined value, temperature snap disc 26 snaps overcenter, pushing plunger 22 downward and moving first leg 52 of electrical strip 20 downward away from finger 58. Again, first leg 52 of electric strip 20 is moved into its disconnected position, opening the electric circuit for the motor of the motor-compressor unit and, consequently, terminating operation of that motor.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A protection device comprising:

a body defining an interior, an electric lead opening, and port means for conducting fluid between the interior and the exterior of the body;

a first electric lead electrically connected to the body;

a second electric lead extending through the electric lead opening, into the interior of the body;

means electrically insulating the second electric lead from the surfaces of the body defining the electric lead opening;

an electric strip located within the body, having a closed position for conducting electric current between the body and the second electric lead and an open position for electrically separating the body from the second electric lead, and moving from the closed position to the open position when the magnitude of the current conducted through the electric strip exceeds a preset current level;

a plunger movably supported within the body for engaging the electric strip to move the electric strip from the closed position to the open position;

a pressure sensitive snap disc located within the body, having a normal position and an overcenter position, and moving from its normal position to its overcenter position to engage the plunger and move the electric strip from the closed position to the open position when the vapor pressure forces on the pressure sensitive snap disc exceed a preset value; and a temperature sensitive snap disc located within the body, having a normal position and an overcenter position, and moving from its normal position to its overcenter position to engage the plunger and move the electric strip from the closed position to the open position when the temperature of the temperature sensitive snap disc exceeds a preset value.

2. The protection device as defined by claim 1 wherein:

the plunger includes a first end engaging the electric strip and a second end spaced therefrom, and defines a shoulder located between the first and second ends of the plunger;

the temperature sensitive snap disc defines a central opening and the plunger extends therethrough;

as the temperature sensitive snap disc moves from its normal position to its overcenter position, the temperature sensitive snap disc engages the shoulder of the plunger; and as the pressure sensitive snap disc moves from its normal position to its overcenter position, the pressure sensitive snap disc engages the second end of the plunger.

3. The protection device as defined by claim 2 wherein:

the body includes a plunger guide defining a plunger opening; and the plunger extends through the plunger opening in a close, sliding fit with the surfaces of the plunger guide defining the plunger opening.

4. The protection device as defined by claim 3 wherein the electric strip supports the plunger within the body.

5. The protection device as defined by claim 1 wherein:

the electric strip includes a first leg having a connected position engaging the body and a disconnected position spaced therefrom;

the plunger engages the first leg of the electric strip; and the first leg of the electric strip moves from its connected position to its disconnected to move the electric strip from its closed position to its open position.

6. The protection device as defined by claim 1 wherein:

the electric strip includes a first leg continuously engaging the body, and a second leg having a connected position engaging the second electrical lead and a disconnected position spaced therefrom;

the plunger engages the second leg of the electric strip; and the second leg of the electric strip moves from its connected position to its disconnected position to move the electric strip from its closed position to its open position.

7. The protection device as defined by claim 1 wherein the body includes:

a shell; and an electrically insulating sleeve covering a lower outside portion of the shell.

8. The protection device as defined by claim 1 wherein:

the pressure sensitive snap disc is secured within the body, extends across and separates the interior thereof into first and second regions, and moves from its normal position to its overcenter position when the vapor pressure in the first region exceeds a preset pressure; and the temperature sensitive snap disc is secured within the second region of the body and moves from its normal position to its overcenter position when the vapor temperature in the second region exceeds a preset temperature.

9. The protection device as defined by claim 8 wherein:

the body defines opposed and spaced apart first and second shoulders;

the pressure sensitive snap disc is tightly captured between the first and second shoulders;

the body further defines opposed, spaced apart third and fourth shoulders; and the temperature sensitive snap disc is loosely captured between the third and fourth shoulders.

10. A protection device comprising:

a body defining an interior, port means for conducting vapor between the interior and the exterior of the body, an electric lead opening, a plunger opening, radially extending and axially spaced first and second shoulders, and radially extending and axially spaced third and fourth shoulders;

a first electric lead electrically connected to the body;

a second electric lead extending through the electric lead opening into the interior of the body;

means electrically insulating the second electric lead from the surfaces of the body defining the electric lead opening;

an electric strip located within the body, having a closed position for conducting electric current between the body and the second electric lead and an open position for electrically separating the body from the second electric lead, and moving from the closed position to the open position when the magnitude of the current conducted through the electric strip exceeds a preset current level;

a plunger supported by the electric strip, movably extending through the plunger opening in a close sliding fit with the surfaces of the body defining the plunger opening, and engaging the electric strip to move the electric strip from the closed position to the open position;

a pressure sensitive snap disc tightly captured between the first and second shoulders of the body, extending across and separating the interior of the body into a first region in fluid communication with the port means and a second region spaced therefrom, and moving from a normal position to an overcenter position to engage the plunger and move the electric strip from the closed position to the open position when the vapor pressure in the first region of the body exceeds a preset level; and a temperature sensitive snap disc loosely captured within the second region of the body, between the third and fourth shoulders thereof, and moving from a normal position to an overcenter position to engage the plunger and move the electric strip from the closed position to the open position when the vapor temperature in the second region of the body exceeds a preset temperature level.

11. The protection device as defined by claim 10 wherein:

the electric strip includes a first leg having a connected position engaging the body and a disconnected position spaced therefrom, and moving from the connected position to the disconnected position to move the electric strip from the closed position to the open position, and a second leg engaging the second electric lead;

the plunger includes a first end engaging the first leg of the electric strip and a second end spaced therefrom, and defines a shoulder located between the first and second ends of the plunger;

the temperature sensitive snap disc defines a central opening and the plunger extends therethrough;

as the temperature sensitive snap disc moves from its normal position to its overcenter position, the temperature sensitive snap disc engages the shoulder of the plunger; and as the pressure sensitive snap disc moves from its normal position to its overcenter position, the pressure sensitive snap disc engages the second end of the plunger.

* * * * *